US005894906A

United States Patent [19]

Weber

[11] Patent Number: 5,894,906

[45] Date of Patent: Apr. 20, 1999

[54] ACCIDENT RESPONSIVE SAFETY RELEASE FOR A MOTOR VEHICLE'S REAR DOOR CHILD-LOCK DEVICE

[76] Inventor: Harold J. Weber, P.O. Box 6161, 560 Washington St., Holliston, Mass. 01746

[21] Appl. No.: 08/747,163

[22] Filed: Nov. 8, 1996

[51] Int. Cl.[6] .......... B60K 28/10

[52] U.S. Cl. .......... 180/274; 180/281

[58] Field of Search .......... 180/274, 271, 180/281

[56] References Cited

U.S. PATENT DOCUMENTS

| | | | |
|---|---|---|---|
| 2,714,521 | 5/1955 | Graham | 180/281 |
| 4,381,829 | 5/1983 | Montaron | 180/274 |
| 4,785,907 | 11/1988 | Aoki et al. | 180/274 |
| 5,574,315 | 11/1996 | Weber | 307/10.1 |

OTHER PUBLICATIONS

BMW Product Brochure OLY2-596-200, p. 35, col. 2, (copyright 1996, BMW of North America, Inc., PO Box 5090, North Branch, NJ 08876).

*Primary Examiner*—Kenneth R. Rice

[57] ABSTRACT

A motor vehicle rear door anti-egress CHILD-LOCK device safety release responsive to an accident involving the motor vehicle whereby a preset CHILD-LOCK device may be immediately unset upon collision between the motor vehicle and another object. The anti-egress CHILD LOCK release enables immediate post-accident unlatchability of the motor vehicle's rear door by an occupant of the motor vehicle and allow unencumbered egress from the motor vehicle. The result is reduced risk particularly for automobile rest-seat passengers including children and adults who might otherwise remain dangerously entrapped within a wrecked vehicle and suffering risk for further post-accident physical or psychological trauma or even death due to bodily entrapment, fire or explosion which may follow an accident.

20 Claims, 8 Drawing Sheets

ACCIDENT RESPONSIVE SAFETY RELEASE FOR A MOTOR VEHICLE'S REAR DOOR CHILD-LOCK DEVICE

BACKGROUND OF MY INVENTION

A majority of contemporary motor vehicles including automobile sedans and "light utility vehicles" (hereinafter, "LUV", such as Jeep Cherokee, Ford Bronco, GMC Suburban, etc) are ordinarily equipped with a safety provision which enables a driver to establish a condition whereby the rear doors of these "4-door" vehicle types can be set so as to not be releasable from within the passenger compartment by rear seat occupants. The underlying "good sense" logical intent for this provision is to allow a parent to preset the latch on the rear doors to a state where a child riding in the rear seat can not accidentally—or willfully—release the door latch, open the door and risk falling out of the automobile, particularly while the automobile is moving. Commonly known as a "child safety lock", "child protection lock", "child security lock" or simply "child-lock", this safety provision has been provided on automobiles and other 4-door vehicles as standard equipment for the past decade or so and its purpose and operation is generally well understood, particularly by parents of young children.

Driving accidents inevitably occur and automobiles are commonly involved in collisions which can lead to unsafe conditions for any passengers remaining in an automobile subsequent to the collision. As a result of this foreknowledge regarding a likelihood for accidents, use of child-locks which have been preset by a driver places rear-seat passengers, irrespective of whether they are children or adults, at extreme risk subsequent to the accident. This occurs because the entrapped rear-seat passenger can not open the rear door and quickly get out of the vehicle before emergency conditions worsen, particularly if fire or explosion threatens the vehicle. The emergency condition is further exacerbated due to the confused state of the entrapped passenger which generally follows an accident's occurrence. Furthermore, the entrapped passenger may suffer shock or injury which thwarts seemingly simple alternative efforts to climb into the front seat and gain egress through the front passenger doors.

1. Field of my Invention

My invention relates to motor vehicles and in particular sedan-style 4-door motor vehicles having a rear seat passenger compartment including rear passenger doors fitted with presettable anti-egress child-lock devices which serve to absolutely deny operability of the rear door's interior door latch release device by the rear seat passenger.

2. Anti-ingress Locking Systems

Motor vehicles have long been equipped with a variety of locks. For example, the ignition of a typical motor vehicle is provided with a uniquely keyed lockset which operates an electric switch that typically turns circuits associated with the ignition portion of the motor on and off, as well as controlling power flow to a variety of accessories included in the vehicle, such as a radio, horn, windshield wipers, heater, etc.

The trunk portion of an automobile such as a Dodge Intripid is ordinarily provided with a keylock which secures the trunk lid to prevent unauthorized entry into the trunk. Similarly, and in many cars a glove compartment is commonly provided with a keylock to thwart pilfering.

Hatchback automobiles (coupes or "3-door" body styles) are usually provided with a keylock on the hatch cover to block access without a key. On commonplace LUVs such as the Jeep Cherokee, Ford Expedition, Mercury Mountaineer, and minivans such as the Chevrolet Venture and Chrysler Caravan a lockset ordinarily secures the rear lift-back door and sliding side-doors, in the case of certain minivans.

Nearly all vehicles, including not only passenger cars such as sedans and coupes, minivans and LUVs, but also trucks, buses and virtually every other vehicle category include passenger door keylocks, at least on the "front" or driver-access doors.

It has been the central purpose for all of the anti-ingress locking devices so far mentioned to embody a mechanical device for securing a door against intruders and thereby serve as a limit to "who" has physical access into a vehicle. Persons without a key are simply locked out, or else entry is forced and illegal. As a convenience to a driver, the locksets in many of the mentioned categories of vehicle having multiple passenger-door anti-ingress lock devices and usually including those with hatchbacks, liftbacks and sliding doors, manufacturers have provided a handy central locking system. The central locking system ordinarily utilizes a motor or solenoid on each (so-equipped) anti-ingress lockset which serves to "Lock" and "unlock" the lockset under control of an electric signal ordinarily controllable at least from the driver's position. Sometimes these central locking systems are elaborated upon by providing "keyless" entry systems, which operate by radio or infrared signals to remotely release or lock the doors, usually by a small handheld actuator device which sends out an encoded wireless signal.

3. Anti-egress Locking Systems

A distinctly separate category of safety oriented locking device for motor vehicles and in particular, "4-door" sedans and similar vehicles having a "back seat" and rear side doors is the now ubiquitous "child security lock" (viz "CHILD LOCK") which is a separate class of anti-egress blocking arrangement that thwarts operation of a door latch handle from the inside of a vehicle by a rear-seat passenger, such as a child. This sort of blocking device is not a key operated lock in a usual sense like that of all of the other heretofore mentioned vehicle locks. It does not lock the vehicle from the outside. It does not prevent unauthorized entry into or use of the vehicle, which is the central intent of all of the keylocks and door locks which I have cited. Instead, the anti-egress CHILD LOCK is singularly intended as an anti-egress safety device solely intended to block unauthorized exit from the rear-seat position of the vehicle.

Rather than being in the class of a key operated locking device, the anti-egress CHILD LOCK is ordinarily operated by a lever or button which is accessible to a driver (e.g., an authorized adult) when the CHILD LOCK equipped (rear) door is ajar. Ordinarily the CHILD LOCK control is located on the outer edge of the rear-passenger door, accessible only when the door is open and fully blocked (by the door jamb) from access by a rear seat passenger when the door is closed. In other words, once the CHILD LOCK is set, the equipped door may only be opened from outside the vehicle using the usual exterior door latch handle. This means that any other class of ingression control locking device, such as the earlier mentioned key-controlled or central locking schemes, must be 'unlocked' in order to make the outside door handle operable.

The obscured operation of the child-lock which denies its release (e.g., performing a SET or RESET state change) when the door is closed is exactly the feature which makes the child-lock particularly hazardous in event of an accident.

In effect the rear-seat occupants are absolutely entrapped, particularly if the front seat occupants are seriously injured or dead. As a result of this entrapment, the rear seat passengers are at high risk for secondary injury, including death, which may additionally result from fire, explosion or further collision (e.g., a chain-reaction collision) with other vehicles when the accident occurs in a busy traffic setting.

Realize that the child-lock is a narrowly specialized anti-egression safety control device which, while frequently called a lock, this is a misnomer in that it alone provides no protection whatsoever to the safeguarding of the vehicle from unauthorized ingression. Instead the CHILD LOCK is a distinctly separate category of device which acts to disable the interior operability of the rear-door latch handle to restrict vehicle egress to occur only when the rear door is released from the outside ordinarily by a person other than the rear seat passenger by using the exterior door handle. CHILD LOCK devices are intrinsicly manual in operation, having the mentioned lever or button sited in the portion of the rear door fitting into the outer rear door jamb.

4. Safety Considerations

With the advent of my accident responsive CHILD LOCK release adjunct, risk intensive entrapment of rear-seat passengers in an automobile subsequent to an accident is expugnable. It is commonplace that a rear-door CHILD LOCK may be in use thereby denying operation of the door's latch-handle by a rear seat passenger prior to an accident. Once the accident occurs, the CHILD LOCK equipped with my instant invention is promptly and automatically released thereby returning full control of the interior door latch to the rear seat occupant. The CHILD LOCK release enables immediate door unlatching and opening subsequent to the accident, thereby exposing an unencumbered exit portal for the rear seat passenger.

With the urging of the National Highway Traffic Safety Administration that "all children ride in the back seats of cars with passenger-side air bags" ("A New Look at Child-Killing Air Bags", *U.S. News & World Report* magazine, Nov. 4, 1996, Page 10), more children will undoubtedly be riding in the rear seating area of the typical automobile and most likely, the prudent parent will preset the CHILD LOCK door devices to prevent the child's likelihood for fumbling with the door latch handle and possibly opening the door. They then become potential victims of entrapment if an accident occurs.

As the *USN&WR* article notes, "last-year . . . they [passenger side air bags] have killed at least 28 children". Moving the children from the front seat, having a door which will typically open after an accident, to a rear seat in which the only egress possibility is through CHILD LOCK protected doors which will not open after an accident is only moving the potential for death and injury from that of the front seat with the air bag being the cause to the back seat and being helplessly entrapped behind unopenable doors.

Immediately following an accident, considerable risk arises due to a chance for fire or explosion due to spilled fuel and electrical short circuits. As a result of these considerations, immediate evacuation of the wrecked vehicle is imperative. Safety dictates that passengers must not be bound into the vehicle by unnecessarily locked doors which may slow-down, if not block, their safe and quick exit from the vehicle.

5. Emergency Child-lock Release

Rear seat passengers are the most apt to become unnecessarily trapped, due to preset CHILD LOCK devices which inhibit door latch release by the rear seat passengers and block possible egress. Heretofore, it is obvious that even minor injury can quickly escalate into major trauma or even death due to an inability to achieve safe and unencumbered passenger egress through a rear door which is unnecessarily blocked by preset CHILD LOCKS. In other words, the child or other passenger is blocked from using the door latch and simply getting out and away from the vehicle before it bursts into flames, explodes or is struck by another vehicle.

Once the accident occurs, the child lock mechanism equipped with my instant invention is promptly and automatically released thereby returning full control of the interior door latch to the rear seat occupant. The CHILD LOCK release enables immediate door unlatching and opening subsequent to the accident, thereby exposing an unencumbered exit portal for the rear seat passenger.

6. Rear Door Lock Conflicts

Rear doors of sedan style automobiles and other CHILD LOCK equipped motor vehicles offer a serious conflict between the two previously mentioned categories of locking systems.

The ANTI-INGRESS door lock system which is intended to keep persons on the outside of the car from getting into the car (for whatever purpose) retains an ability for persons entrapped inside the car to still get out after an accident. In a usual vehicle, the inside door handle ordinarily remains operative and is available to release the door's latch. As a result the rear seat passenger can always get out.

The ANTI-EGRESS door lock system characterized by the CHILD LOCK type of latch disablement device is, on the other hand, solely intended to block the back-seat passenger from getting out of the vehicle. The inside door latch handle is simply made inoperative and ineffectual. On the other hand, in absence of the separately acting ANTI-INGRESS locking system being set or 'locked', any person on the outside of the vehicle may readily open the rear door and gain entry. This external opening of the door is accomplished concurrent with the CHILD LOCK device being set or 'locked' to deny exit possibility for the rear seat occupant. In other words, an intruder can get in while the rear seat passenger can not get out.

A worst case scenario occurs when both the CHILD LOCK is set and the DOOR LOCK is set albeit such 'settings' are separately performed functions. Under this condition, no one on the inside of or on the outside of the automobile can operate the rear door's latch and open the door. In a post-accident setting this sort of 'double-lockup' by the two separate locking system functions can make quick and efficient entry by emergency personnel virtually impossible even when the entrapped rear seat occupant is conscious and would ordinarily be able to release the door latch or open the door for help, if only the CHILD LOCK was not set and at least the interior latch handle regained its door release function.

In my U.S. Pat. No. 5,574,315 on Nov. 12, 1996, I have taught a sensing of an accident involving a vehicle which immediately upon collision, serves to roll-down or open the vehicle windows and electrically unlock each DOOR LOCK on the vehicle. What is clearly construed by this definition, as shown in the patent's specification and drawings, is that the unlocking of the door portions principally involves the key operated anti-access door lock controls. Remember that, even the rear seat doors of a typical vehicle are indirectly, albeit securely, controlled by a keylock at least on the driver-position door. In other words, using a central electric locking system or else pushing down the "button" on a mechanically locked rear door serves primarily to restrict vehicle entry to a person having a key and thereby blocks unauthorized ingress into the vehicle. In the '315 patent's claims I mention an anti-egression control apparatus which is "presettable to inhibit manual release of a usually rear position interior door latch" only as an adjunct to the central theme of the patent, that being to maximize overall vehicle egression possibilities subsequent to an accident.

Realize that the CHILD LOCK device portion of my '315 patent as described in this teaching is unequivocally partitionable as a separate inventive subject since the CHILD LOCK serves a totally different functional purpose from that of the DOOR LOCK. The CHILD LOCK serves as a safety oriented exit control device and is not intended as a security oriented lockup device which blocks entry into the vehicle by an outsider. More distinctly it is an interior latch control device which promotes rear seat passenger safety (viz child safety) by denying unauthorized or (more to the point) unsafe operability of the inside door latch handle by the passenger.

SUMMARY

Automobiles and similar motor vehicles which have separate rear-seat access door provisions ordinarily include a device on the rear seat doors which can be preset to intentionally block unauthorized vehicle egress by the rear seat passenger. Focus for this sort of egress blocking restriction is primarily on child safety. Denying operation of the interior door latch handles results in the situation where the rear doors may only be opened form the outside of the vehicle. Typically, this means the child is locked-in the car and the parent or guardian determines their exit. In addition to the intended and obviously advantageous application, with children, restrictive anti-egress door blocking may benefit other large categories of persons. These might include elderly persons with Alzheimer's disease, mentally retarded or unstable persons, incarcerated persons, etc.

Automobile accidents are so commonplace that they are almost inevitable in our contemporary society. As a result, accidents involving vehicles having "set" CHILD LOCK devices pose a substantial threat to rear seat passenger safety. Extensive bodily harm or death may follow an initial accident event due to secondary hazards presented by fire, explosion or multiple car collisions. An entrapped rear seat passenger who can not release the rear door latch from inside the vehicle may quickly become more seriously injured, if not killed, by these secondary hazards Aside from common human decency, entrapped rear seat passengers who become injured or more extensively injured simply because they could not quickly escape from a wrecked automobile places an enormous societal burden on all of us. Simply put, costly and sometimes scarce resources must be utilized to overcome the needless injuries as well as emotional scarring which can lead to years of dysfunctional fears and therapy for entrapped victims.

Having said this, you should now realize that my teaching describes a method and defines the necessary apparatus necessary to release the entrapped victim of an accident and potentially minimize a likelihood for further injury or death. When a moving motor vehicle rams another object in an accident collision forces are released which usually imparts extensive mechanical damage to the vehicle. Concurrently, occupants of the vehicle are frequently injured. In particular, front seat passengers (e.g., the driver, etc.) may be seriously injured to such extent that they can not get out of the car due to trauma, unconsciousness, entrapment by vehicle hardware, etc. At the same time, rear seat passengers who generally stand a better chance for sustaining less serious injury may be entrapped in the rear seat because the rear door latches can not be released using the inside door handles. Such a condition may be intentionally established by someone presetting the CHILD LOCK mechanism.

With my invention in place, the collision forces are sensed and determined to indicate an accident. As a direct result of the sensed collision forces, the CHILD LOCK device is automatically and immediately unset. Thereafter the rear seat occupants can utilize the interior door handles to unlatch the rear doors and egress from the vehicle so as to escape entrapment. Of course they may, if of adequate physical build, attempt to extricate the front seat victims, if necessary.

A typical CHILD LOCK device is usually included as a separate portion of a typical motor vehicle door latch. Ordinarily, CHILD LOCK mechanisms are ordinarily found only on rear doors of 4-door passenger vehicles (e.g., sedans) since that is where they are most necessitous. Obviously, this does not preclude their use on other doors or hatches as may be dictated by a particular vehicle's design. As I said earlier, the term "lock" in the usual sense of motor vehicle locks is a misnomer because conventionally, locks on vehicles serve as anti-ingress locks which are intended to keep unauthorized gaining access into (e.g., getting into) the vehicle. A CHILD LOCK device, on the other hand, blocks rear seat occupant egress by defeating the operability of the inside, passenger accessible rear, door latch handle. A CHILD LOCK does not lock-up or secure a vehicle from unauthorized entry from the outside of the vehicle by an intruder. The outside (exterior) door latch handle remains fully operative when a CHILD LOCK alone is preset.

I can show that a rear door closure mechanism of ordinary design, produced by numerous motor vehicle makers including General Motors, Ford Motor Co. and Chrysler Corp., as well as most foreign (non-USA) makers includes three distinct portions:

(1) A LATCH which interacts with bolt on the fixed door jamb that serves to secure the door in a "closed" state and whereby the latch is ordinarily releasable using either one of an inside door latch handle and an exterior door latch handle.

(2) A DOOR LOCK which in the rear door application may manifest itself as a "button" usually located on the sill of the rear window-glass and which serves to inhibit the exterior door latch handle particularly against release by an unauthorized person or potential intruder.

(3) A CHILD LOCK is a recent safety feature innovation which is unique to the rear door closure mechanism. Control of the usual CHILD LOCK device is ordinarily embodied as a lever or button which can be manipulated by a vehicle operator to be preset to a position whereby the interior door latch handle is rendered inoperative and refuses to unlatch and allow opening of the door. Thereby possible egress is blocked. The exterior door latch handle is unaffected by the preset state of the CHILD LOCK. The exterior door latch handle may therefore be operated in a normal manner by a person located exterior to the vehicle, subject of course to the setting of the DOOR LOCK provision.

As this shows, the underlying functional operative purpose of the DOOR LOCK and the CHILD LOCK in a motor vehicle of known design is functionally separate. The CHILD LOCK and the DOOR LOCK are conventionally understood to have a different functional purpose warranting their overall inclusion in the door closure mechanism. Several possible state of operation may occur, due to the functionally separate character of DOOR LOCK mechanisms and CHILD LOCK mechanisms:

| DOOR LOCK | CHILD LOCK | INGRESS INTO | EGRRSS OUT-OF |
|---|---|---|---|
| UNSET | UNSET | YES | YES |
| SET | UNSET | NO | YES |
| UNSET | SET | YES | NO |
| SET | SET | NO | NO |

The point of this showing is that a CHILD LOCK is not a portion of any central locking system, nor is it affected by any state of a vehicle's usual key-lock settings or central locking system status.

The point of this is that a CHILD LOCK is NOT a portion of any central locking system, nor is it affected by any state of a vehicle's usual key-lock settings or central locking system status. The world knows of post-collision lock releases which operate through the central locking system to unlock the doors of a motor vehicle subsequent to an accident in order to permit ingress by emergency personnel or bystanders arriving at the accident scene. Such earlier accident responsive central unlocking systems do not serve to unset CHILD LOCK provisions, nor is it obvious from these earlier teachings as to how a CHILD LOCK might be responsively unset without a contribution of inventive hardware and methodological novelty to extend the fundamental essence of the CHILD LOCK's usual intended purpose and ordinarily embodied form.

OBJECTIVES

My inventions object is to provide immediate unsetting or release of a preset anti-egress CHILD LOCK device on a motor vehicle's rear door in response to a sensed accident occurrence.

Another object served by my invention is to assure a rear seat passenger of an ordinary 4-door vehicle to have immediate and uninhibited egress possibility through the nearest rear door opening.

Still another object for my invention is to give assurance to a parent or other operator of a motor vehicle that a preset rear door CHILD LOCK will be become immediately unset if the motor vehicle is involved in a collision with another object, thereby reinstating normal operability of the rear door latch mechanism to allow a normal opening possibility using the regular door latch handle in event of a collision thereby providing an escape route portal for any rear seat passenger.

A further object of my invention is to teach an operative mode under which the CHILD LOCK may be preset by the vehicle operator, with actual CHILD LOCK action (e.g., disablement of the inside door latch handle operation) occurring only when the motor vehicle ignition switch is turned-ON, while the CHILD LOCK action is otherwise unset when the ignition switch is turned-OFF.

DESCRIPTION OF DRAWINGS

My invention is depicted on 8 sheets of drawings including 9 illustrative figures.

DESCRIPTION OF MY INVENTION

Figure 1:
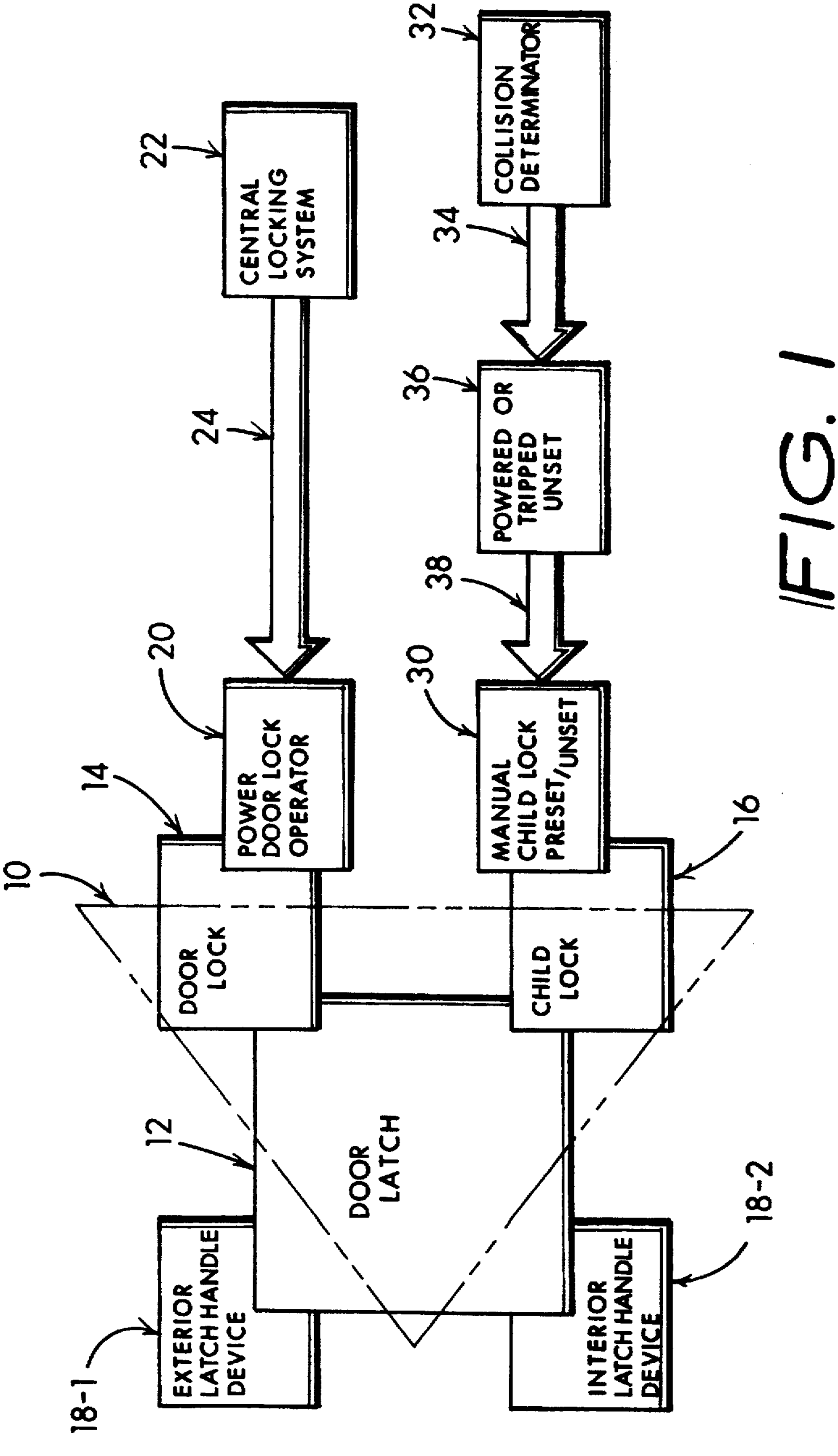
FIG. 1—The various functions of a rear-door locking system, including my collision activated CHILD LOCK unset device.

A triad of ordinary components which make up contemporary motor vehicle rear door latch operations is shown in FIG. 1. The triad of these prior art devices is enclosed by the broken line 10, to include:

1. a door latch mechanism 12;
2. a door latch lock 14 which serves to lock the door latch mechanism 12 to resist operation by unauthorized persons; and,
3. an anti-egress child security lock 16 which is principally intended to thwart egress by rear seat passengers.

Such a latch combination, while not explicitly detailed in FIG. 1, is exemplified by (FoMoCo) part no. 26412 utilized, for example, on a 1993 Mercury Grand Marquis sedan. In that setup, a rod (FoMoCo. no. 26420) extends from the usual window sill "button" to manually "lock" the latch from outside operation by the exterior door latch handle 18-1 (FoMoCo. no. 26604). Additionally, a power lock operator 20, or power unit (FoMoCo. no. 26594), may remotely operate the door lock mode from a central locking system 22 through intervening coupling signal cabling 24. A separate latch control, obscured in the door jamb area, is also available to manually preset an anti-egress child security lock (viz CHILD LOCK) 30 which functions to disable operability of the inside door latch handle 18-2 (FoMoCo. no. 21818).

My invention introduces a collision determinator 32 coupled 34 with a powered CHILD LOCK unset device 36 that couples 38 with the manual CHILD LOCK device 30 to produce automatic unset of the CHILD LOCK in event of vehicle collision with another object. Prior to my invention whenever the motor vehicle having a preset CHILD LOCK became involved in a collision any passenger such as a youngster or even an elderly person sitting in the rear seat area was immediately entrapped and could not quickly attain egress from the vehicle. In other words (in motor vehicles lacking my invention) the rear seat passenger is put at unnecessary risk and in some cases, extreme risk, subsequent to the accident and particularly if vehicle fire or other hazards persist. In motor vehicles equipped with CHILD LOCK devices prior to my invention, the rear seat passenger can not operate the inside door latch handle and is therefore passenger escape in case of an accident is solely at the mercy of any bystander or emergency personnel who may happen upon the accident. Climbing over the seats and exiting through a front door is a possible alternate route, but in a usual accident, the front seat occupants are likely to be blocking this possibility if they are injured or unconscious. Since front seat passengers are at statistically higher risk and more likely to sustain severe injury, front door exit is a limited option. Additionally, front doors are more likely to be damaged or jammed and unopenable (particularly in head on or frontal collisions), whereas rear doors may still be operable if only they were unlatchable from within the vehicle's rear passenger compartment.

Figure 2:
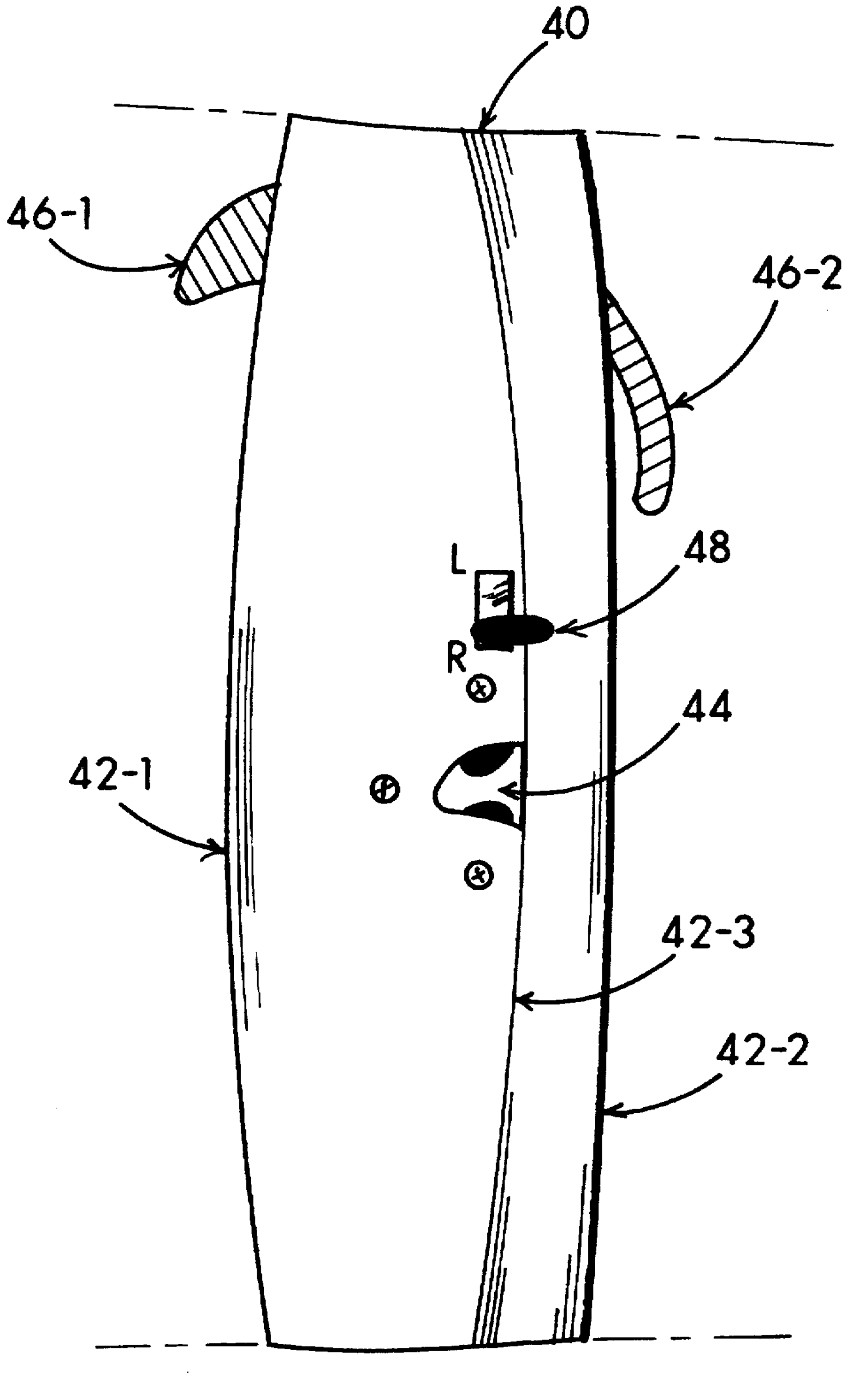
FIG. 2—Cross section of a vehicle door jamb showing the exterior latch handle, interior latch handle and CHILD LOCK preset control knob.

A section of a representative automobile rear door 40 is shown in FIG. 2 to include an outer panel 42-1, an inner panel 42-2 and an offset forming a door jamb 42-3 with the portion between panel 42-2 and jamb offset 42-3 being lower or indented relative with the portion between the offset 42-3 and the panel 42-1. Usually, this drop is about ¾ to 1½ inch in common motor vehicle configurations. This representative door section 40 also includes a door latch 44 which corresponds with an unshown bolt ordinarily situated in the motor vehicles corresponding body pillar area. In other words, the door latch 44 receives the bolt and holds the door securely shut, as is extremely well known and understood in the art.

An exterior door latch handle 46-1 may operate the door latch device 44 from outside the motor vehicle. Similarly, an interior door latch handle 46-2 may operate the door latch device 44 from inside the motor vehicle. A child security lock (viz CHILD LOCK) preset control 48 may be set to a blocked (preset) position L or released (unset) position R. When preset, the child security lock inhibits (i.e., blocks) operability of the inside door latch handle 46-2, although the outside door latch handle 46-1 operability is maintained. Throughout my description and claims, a "preset CHILD LOCK" denies operability of at least the inside door handle, whereas an "unset CHILD LOCK" allows ordinary operation of the motor vehicle's door latch control handles substantially as if no CHILD LOCK provision were included in connection with the door latch.

Figure 3:
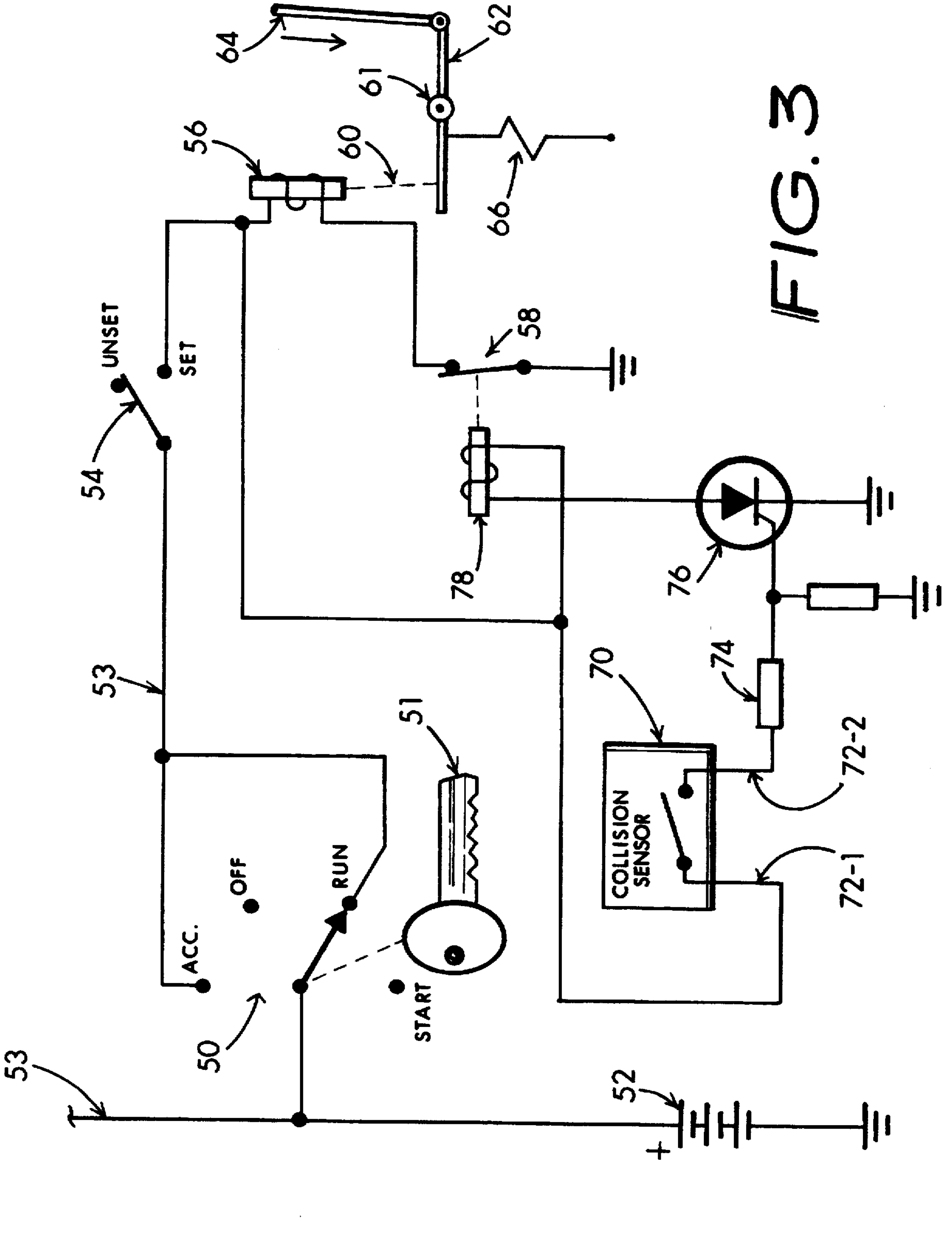
FIG. 3—Wiring hookup for a "fail safe" CHILD LOCK unsetting device which presets the CHILD LOCK by power flow through an electromotive actuator which maintains a control level in the "preset" state.

With FIG. 3 I depict an embodiment utilizing electrical control of the CHILD LOCK device. An ignition switch 50 (actually, a section of the vehicle's usual ignition switch) operated by a key 51 couples power flow between a battery 52 and a connective bus 53 which couples with a CHILD LOCK control switch 54. Power flow occurs when the ignition switch is in the RUN or ACC (accessory) position. The CHILD LOCK control switch includes an UNSET and SET position (SET corresponds with PRESET). When switched to the SET position, DC power flows from connective power line 53 to an electromagnet (electromotive actuator or solenoid) 56 and finds circuit completion through a normally closed relay contact set 58 to ground. As a result of current flow, a magnetic field 60 draws the operator arm 62 upwards to the electromagnet and against the resistance of a spring 66. The operator arm pivots about a pivot point 61, levering an actuator arm or rod 64 downwards. The actuator rod 64 ordinarily hooks onto the motor vehicle's rear door latch mechanism and when moved downward, serves to introduce anti-egress CHILD LOCK protection (e.g. serving to inhibit inside door latch operation). Therefore the illustrative combination of the electromagnet 56, operator arm 62 and actuator arm 64 collectively form a "setter" which functions to set (e.g., preset) the CHILD LOCK function.

A collision sensor 70, which is an extremely well known art in view of the need for sensors of this sort to deploy air bags in contemporary vehicles, couples a flow of DC power between line 72-1, to line 72-2 in event of an accident. Ordinarily the contacts represented in the collision sensor 70 are open (or in a highly impeded state). Upon accident occurrence and in view of resulting high "G-force" shocks the collision sensor at least momentarily produces a state of closure (or a high conductance state) through the represented contacts, thereby introducing DC power on line 72-2 that couples through a resistor (say 820 ohms) to a thyristor 76 gate element. As a result, the thyristor 76 (which might be a silicon controlled rectifier or SCR, as schematically symbolized) goes into full conduction producing substantial current flow through relay coil 78 which acts upon a normally closed (NC) contact set 58 to produce interruption of DC power flow through the electromagnet 56. The thyristor ordinarily exhibits a latching characteristic, that is once it is triggered by the collision sensor, current flow through the thyristor is maintained until DC power flow through the ignition switch or through the CHILD LOCK control switch 54 is interrupted.

A salient safety advantage of this hookup involves an intrinsic fail-safe feature. Frontal collision (or collision involving the front end) of a motor vehicle is a most common form of accident. When frontal collision occurs, the motor vehicle's battery 52 is apt to be damaged or destroyed, instantly eliminating the usual source of DC power. Fret not for the loss of DC power is operatively identical to the opening of the CHILD LOCK control switch 54 to the UNSET position. As such the CHILD LOCK device will be automatically UNSET upon collision when loss of the battery as a source of DC power is experienced.

Figure 4:
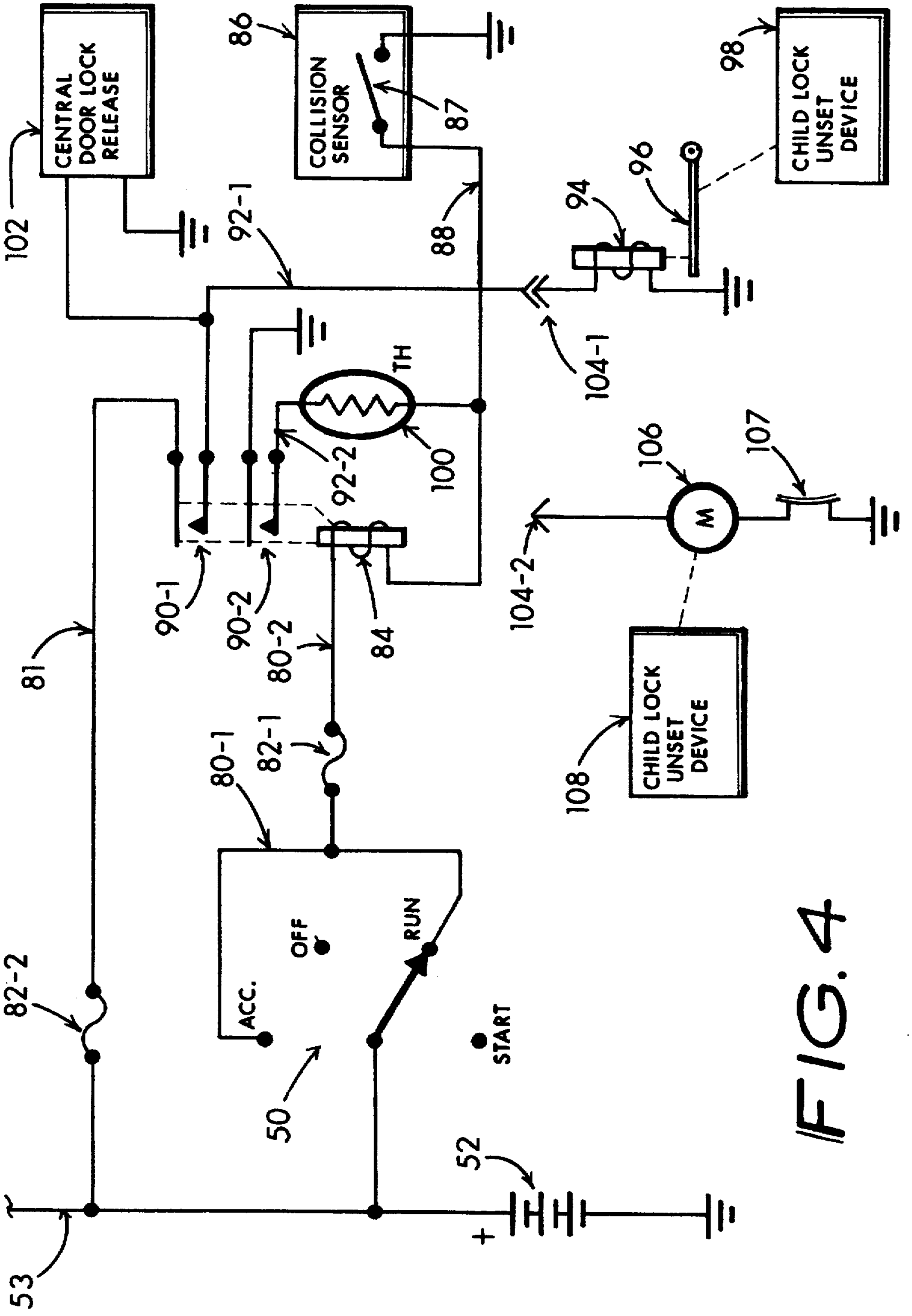
FIG. 4—Wring hookup for a CHILD LOCK unsetting device triggered by a collision sensor which drives an electromotive actuator to unset the CHILD LOCK, particularly when the ignition key switch is in an ON position. Also shown is the release of the vehicle's DOOR LOCK system.

Automatic, accident responsive release of the preset CHILD LOCK is shown in a hookup of FIG. 4. In this arrangement, DC battery 52 power couples through the RUN (or ACC) positions of the ignition key switch 50 to deliver DC power on line 80-1 and through fuse 82-1 to line 80-2 that couples with one end of the winding of relay coil 84.

DC power from the battery 52 also couples through a fuse 82-2 with line 81 and a movable contact of the relay normally open (NO) contact set 90-1. A collision sensor 86, which at least momentarily closes NO contact set 87 acts to at least briefly ground line 88 that couples with the other winding end of the relay coil 84. Immediately upon occurrence of the grounding, albeit momentary, of line 88 by the collision sensor contact set 87, the NO relay contact set 90-2 closes and connects line 92-2 effectively to ground through the now closed contact set 90-2. The grounded state of line 92-2 effectively couples the line 88 to near ground via a thermistor 100.

The thermistor 100 is selected to have a time constant over which it increases its cold resistance severalfold due to self-heating of current flow (to the relay 84 coil) through the thermistor. By judicious engineering including selection of an initial value of thermistor cold resistance, thermistor element mass and possibly inclusion of limited capacity heat sink associated with the thermistor, a time delay is introduced during which the relay coil 84 is "self latched" by the contact set 90-2 and the relay "holds-in" even if the contact set 87 re-opens.

The essence of the thermistor 100 in combination with the relay 84 is to provide a closure of NO contact set 90-1 for a few seconds duration. During this closure period, DC power on line 81 couples with line 92-1 and therefrom through a connection 104-1 to the electromagnet winding 94. The ensuing current flow causes the armature (operator) 96 of the electromagnet (or solenoid) to move to such an extent that, through its coupling with the CHILD LOCK unset device 98, a state of release for all preset CHILD LOCK devices is immediately UNSET and the disablement of interior door latch handle operation is relaxed. Release of the relay 84 is accomplished when the thermistor 100 heats-up enough to lower the holding current flow (e.g., voltage drop across the thermistor) to less than the hold-in current typical of the selected relay 84 whereupon the relay drops out. The momentary opening of the relay contact set 90-2 interrupts the holding current flow via the thermistor 100 and the relay "drops-out".

Concurrent unlocking of all exterior door latch locking devices, when operated under the control of a central door lock release 102 may also be adjunctly implemented, thereby enabling ready access into the vehicle by bystanders and rescue personnel immediately subsequent to the accident.

Design of some vehicle latches may be better served by using a small electric motor 106 typically including a gearing arrangement which actuates an UNSET mechanism associated with the CHILD LOCK unset device 108. A motor limit switch 107 is included to shut-off the motor once its task-at-hand is complete, for the balance of the time duration of relay 84 contact set 90-1 closure.

Figure 5:
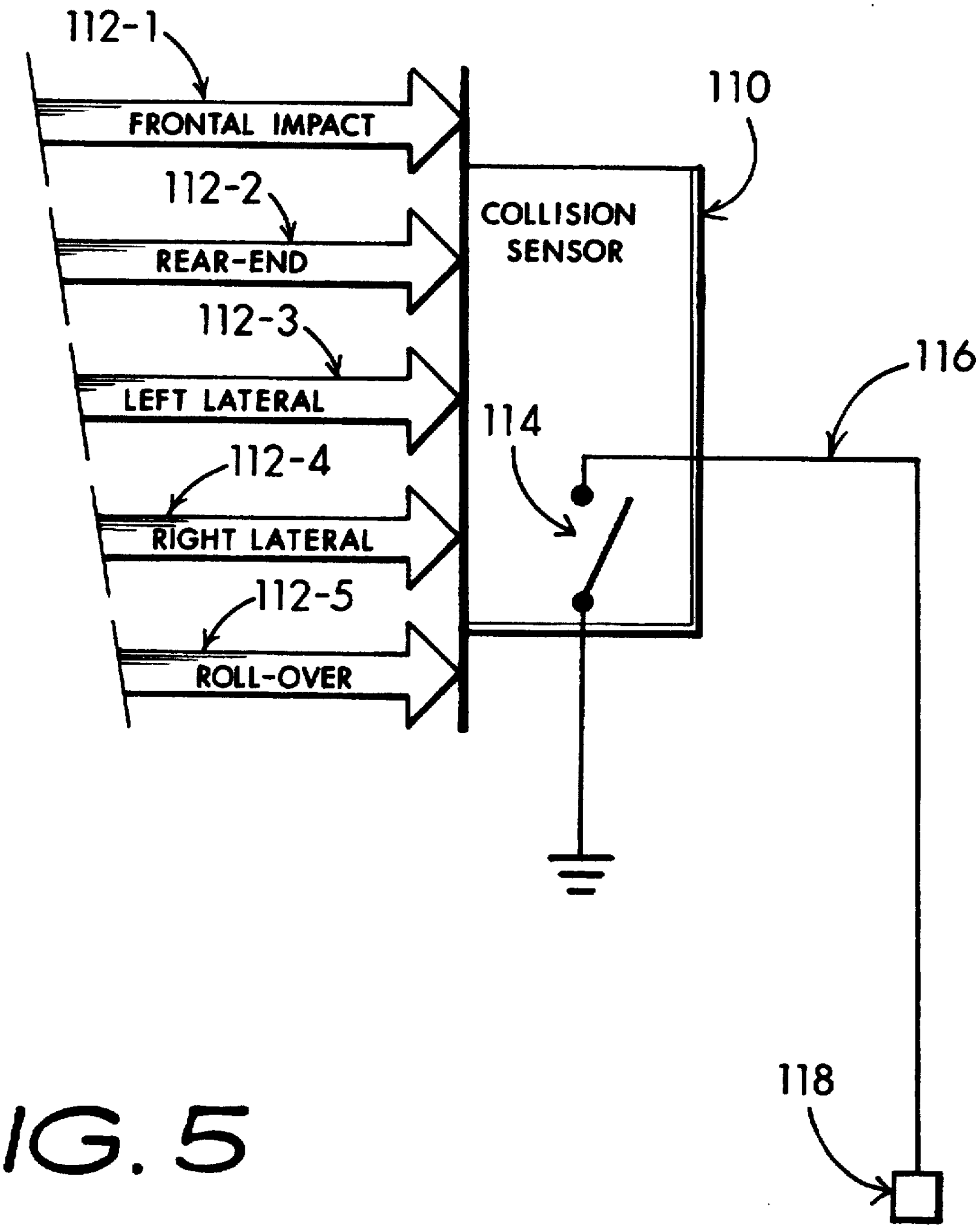
FIG. 5—Depiction of various forces which play upon the collision sensor.

A collision sensor 110 appears in FIG. 5 which shows the influence of several stimuli to achieve at least momentary closure of NO switch contact set 114, producing a LOW or ground state on line 116 which may couple to my invention's control circuitry, such as the relay coil 84 of FIG. 4. The stimuli may include any combination frontal impact forces 112-1, rear-end collision forces 112-2, left lateral impact forces 112-3; right lateral impact forces 112-4 and roll-over forces 112-5. This teaching does not focus on the collision sensor since this is a well known and documented area which can utilize any of numerous apparatus constructions to satisfy the requirements for my invention. Collision sensors are, for example, used widely with collision safety air bags and it is reasonable to expect a practitioner to utilize signals from such air bag collision contrivance to trigger the operation of my CHILD LOCK unset system.

Figure 6:
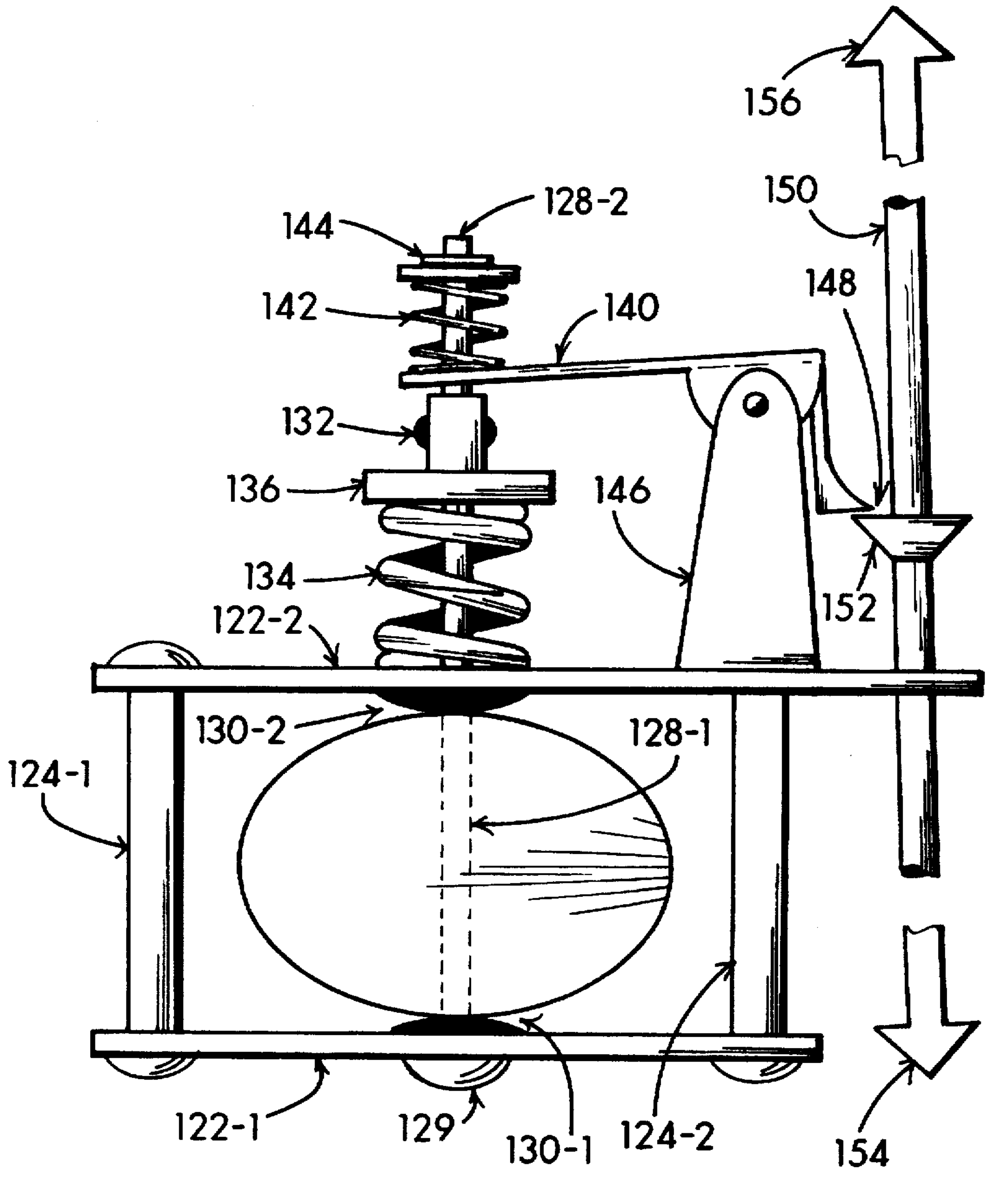
FIG. 6—A mass inertia responsive collision sensor which releases movement of a lever coupled with the anti-egress CHILD LOCK to "unset" the CHILD LOCK subsequent to an accident.

Conventional CHILD LOCK devices used on contemporary vehicles are entirely mechanical in operation. They do not sport electric motor or solenoid operation. In FIG. 6 I depict a mechanism 120 which can serve to illustrate how this fully mechanical operation may be retained, freeing the CHILD LOCK unsetter from vehicle battery power dependence. After all, the battery may be among the first components of the vehicle's engine compartment to be destroyed in a collision.

Two heavy metal plates 122-1,122-2 are adapted as the support frame for, my collision responsive CHILD LOCK unsetter. The plates are held apart by several spacers 124-1, 124-2 which are ordinarily riveted, bolted or welded to the plates. In practice four or more spacers like 124-1 are utilized, arranged in an array around a central elliptically shaped force sensitive mass 126-1. The mass may be steel or other high density material of known weight, whereby the "G-forces" introduced to the mass during collision can be defined as developing predictable energy levels. A sacrificial rod member 128-1 (e.g., a shear rod) passes through the mass 126-1 (as depicted by broken lines) and extends upwards with the extreme end 128-2 protruding above a stack of other elements. The shear rod 128-1 also includes a retentive "head" 129 which may be mushroom shaped, similar to the head commonly found on carriage bolts.

Extreme forces which occur during collision are focused by the mass 126-1 to produce side-shear between the mass and an elliptically surfaced shear die, the intent being that during collision the impact induced energy (inertial energy) of the mass acts to shear-off the sacrificial rod 128-1 at either end of the mass, e.g. in zones 130-1, 130-2. Ordinarily the shear die is a hardened carbon steel, while the shear rod may be mild steel or other metals, such as aluminum or brass. The impact level which produces satisfactory severance of the shear rod 128-1 becomes a standard engineering dynamics problem, knowing at least: angle of impact force relative with shear rod axis; rate of impact; weight and shape of the mass 126-1; shear rod 128-1 dimensions, and shear rod material characteristics.

Initial pre-accident state of the overall impact sensor includes the shear rod 128-1 passing through the mass 128-1 and upwards through a spring 134 kept under compression by a spring keeper 136 held in place by a collar 132 including a rivet retainer passing through the collar and the shear rod. An operator arm (lever) 140 passes over the shear rod and pivots on a pivot support 146. The operator arm extends to include a pawl 148 which snaps over a catch 152 formed on an actuator rod 150 when the actuator rod is moved downwards 154. In effect, the actuator rod is held in position by the snap action which occurs between the pawl 148 and catch 152.

When the actuator rod is moved downwards 154, the catch 152 tends to move the pawl 148 and attached arm leftward, resulting in upward move of the operator arm 140. This produces a compression of spring 142 which is held on the sacrificial rod 128-2 by a spring keeper 144. The spring 142 serves to produce a positive pressure against the operator aim 140 which then serves to retain the pawl 148 snugly over the catch 152.

When an impact occurs during a collision which is sufficient to cause the mass 126-1 to shear the sacrificial rod 128-1, the upper sheared-off portion of the shear rod (which passes through the spring 134) is released upwards by the compressive force stored in the spring 134. This action immediately moves the operator arm 140 upward, unengaging the pawl 148 relationship with the catch 152. As a result, the actuator rod 150 is released to move upward 156. Usually the actuator rod 150 finds attachment with the CHILD LOCK unset mechanism and is ordinarily held under considerable spring tension which serves to immediately urge the actuator rod upwards 156 and acts to UNSET the CHILD LOCK device.

Figure 7:
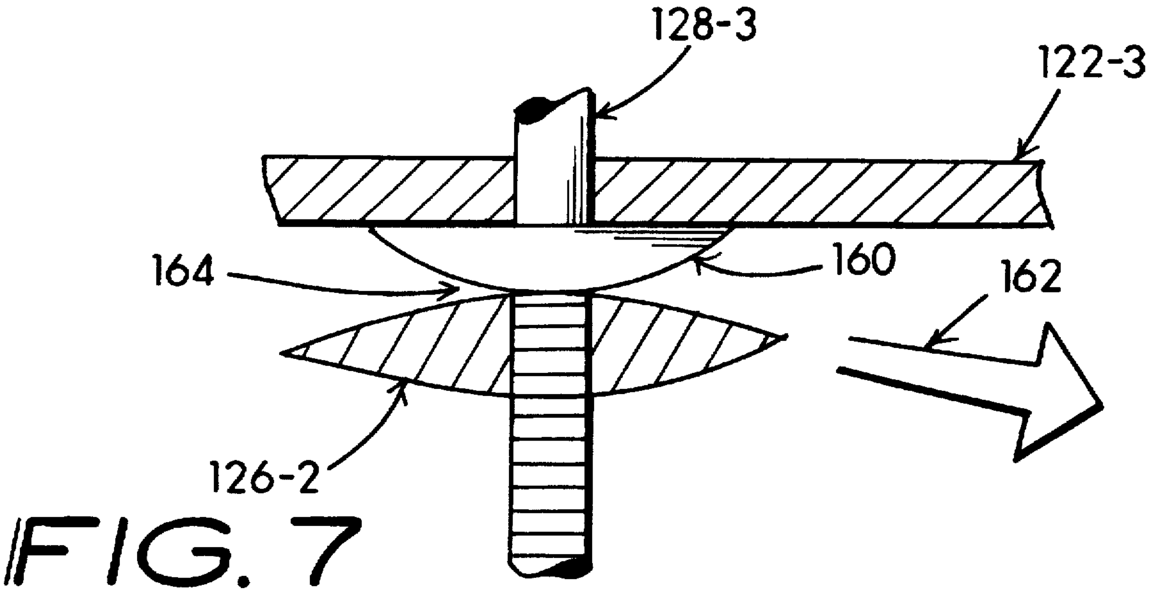
FIG. 7—Showing of important shear effect impact sensing used to release lever of device shown in FIG. 6

Side shear forces 162 prompted by the mass 126-2 are shown in FIG. 7 to produce a cutting action between the knife-edged shear die member 160 and the shear rod 128-3 in the region 164.

Figure 8:
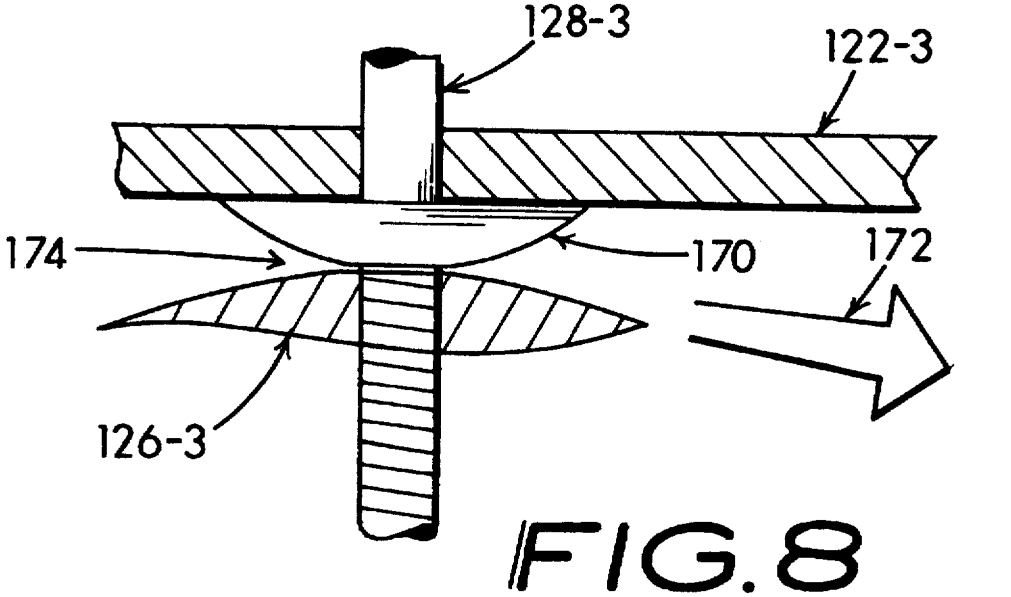
FIG. 8—Variant showing of important shear effect impact sensing used to release lever of device shown in FIG. 6.

Side shear forces 172 prompted by the mass 126-3 are shown in FIG. 8 to produce a cutting action between the knife-edged die member 170 and the shear rod 128-3 in the region 174. The mating surfaces of the mass 126-3 and the shear die 160 are shown to be flat relative with each other, which may serve to optimize the shear forces between the two members.

Figure 9:
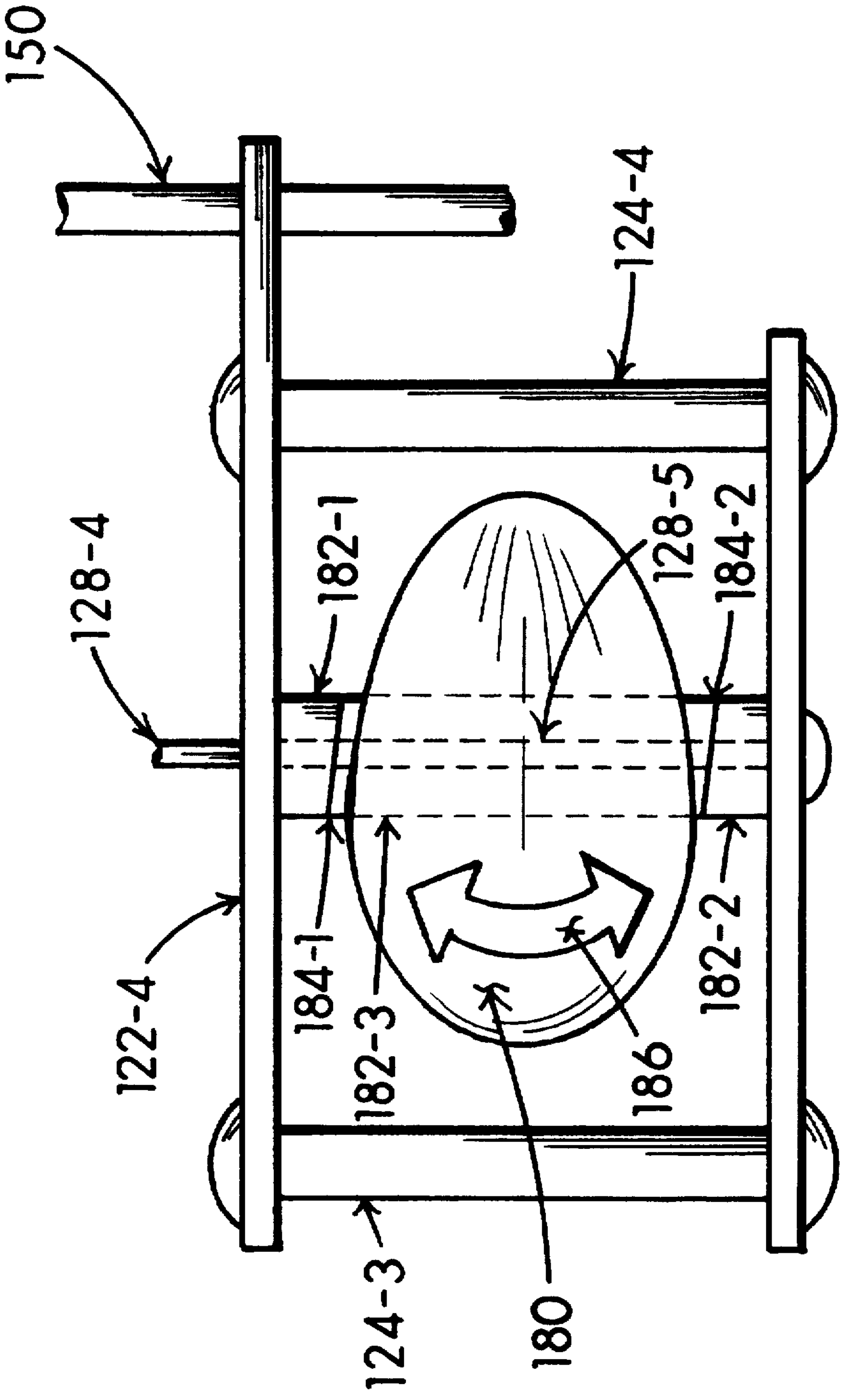
FIG. 9—Mass inertia responsive impact sensor of FIG. 6 utilizing off-center mass distribution to achieve polydirectional sensing.

Nearly omnidirectional impact force response is experienced by the elliptical, essentially "egg shaped" mass 180 of FIG. 9 which is configured to have a non-symmetrical mass distribution (e.g. the mass-weight center is not centered about the shear rod 128-4). In part this intentionally unbalanced mass configuration is accomplished by the lop-sided "egg shape" and in part by the intentionally off-center location of the shear rod 128-4 passage through the mass 128-5. Shear dies 182-1,182-2 are held intimately against a shear die 182-3 which passes through the elliptical mass 180, creating the shear zones 184-1, 184-2 which surround the shear rod 128-4, 128-5. The non-symmetrical balance of the egg shaped mass 180 introduces "twisting" forces and shearing forces from just about every important angle of impact. For example, impact direction coincident with the axis of the shear rod 128-4 delivers side shear forces as depicted by the curved shape of the inertial mass forces 186 due to the off-center "center of gravity" or "ineritial mass center" of the sensor mass 180.

CHILD LOCK security devices have been known for a long time. What has not been known is implementation of an accident responsive unsetting of the CHILD LOCK to provide immediate, unencumbered rear seat passenger egress subsequent to a vehicle-disabling accident. While some hindsighted experts of related art may say that this is mere extension of accident responsive centralized DOOR LOCK release, which is a known art form, it must be remembered that the CHILD LOCK system is (and has for a long time been) uniquely separate from any central DOOR LOCK systems. CHILD LOCK controls and resulting DOOR LATCH interaction satisfies a substantially different safety oriented product goal than the security oriented objective for which DOOR LOCK mechanisms are ordinarily installed. I reiterate then that, unless the beast of hindsight is unleashed, no mere adaptation of DOOR LOCK system technology is readily applicable to CHILD LOCK unsetting without an inventive act being involved and a fundamental tenet of novel utility introduced by my teaching is grossly ignored.

I anticipate and even expect that a skilled artisan may develop the details of my invention's implementation with considerable variation regarding hookup, hardware details and even operational preferences. Such alternate schemes result from mere application of retroversive engineering skill coupled with the plethora of parts, components and known mechanisms which might be utilized to construct practical apparatus according to the underlying teachings of my invention.

What I claim for my invention is:

1. A method for releasing a motor vehicle's rear door latch mechanism's anti-egress child-lock device in response to a collision between the motor vehicle and another object and including steps of:

presetting state of the anti-egress child-lock device on at least one said rear door to thereby inhibit manual operability of the rear door latch mechanism's interior latch release device;

operating the motor vehicle with the preset said anti-egress child-lock device in the preset state;

accidentally colliding the motor vehicle usually with another object;

sensing the accidental collision to produce a crash signal in response to an impact level in excess of a predetermined threshold;

unsetting the preset state of the anti-egress child-lock device in automatic response to the crash signal; and, enabling manual operability of the interior latch release device by an occupant subsequent to the collision.

2. The method of claim 1 further comprising:

said sensing the collision produces the crash signal as an electrical crash signal; and, electrically unsetting the preset state of the anti-egress child-lock device in response to the electrical crash signal.

3. The method of claim 1 further comprising:

locking operation of the motor vehicle through an ignition switch having at least an OFF state and an ON state;

said sensing the collision and producing the crash signal as substantial electrical conductance between at least two crash sensor terminals;

circuitously coupling the crash sensor terminals with the ignition switch, an electric releaser and a source of electric power;

interrupting the circuitous coupling and inhibiting coupling of the crash signal with the electric releaser when the ignition switch is in the OFF state;

enabling the circuitous coupling when the ignition switch is in at least the ON state; and, engaging the electric releaser to unset the anti-egress child-lock device in response to an occurrence of the crash signal, thereby enabling manual operability of the rear door latch mechanism's said interior release device.

4. The method of claim 1 further comprising:

locking operation of the motor vehicle through an ignition switch having at least an OFF state and an ON state;

circuitously coupling normally conductive terminals of a crash sensor with the turned-ON ignition switch, an electric setter and a source of electric power and therebetween producing a flow of electric power;

establishing the preset state of the anti-egress CHILD LOCK device in response to an activation of the electric setter as substantially excited by the flow of electric power through an electric current path completed by the circuitous coupling;

interrupting the circuitous coupling when the ignition switch is in the OFF state;

interrupting the normally conductive terminals of the crash sensor and the circuitous coupling in response to the collision signal and, releasing the electric setter to UNSET the preset said anti-egress child-lock device in automatic response to the interrupted said circuitous coupling and resulting disablement of the flow of electric power.

5. The method of claim 1 wherein said sensing of the collision produces the crash signal through further steps including:

converting collision related impact force into a first mechanical action comprising the crash signal; and, mechanically unsetting the preset state of the anti-egress child-lock device in response to the first mechanical action.

6. The method of claim 5 wherein the converting of collision related impact force into a first mechanical action includes steps of:

shearing a sacrificial shaft member resulting from a differential displacement of an inertially substantial mass relative with the sacrificial shaft member as induced by the collision related impact force; and, enabling an occurrence of the first mechanical action in response to the sheared sacrificial shaft member.

7. The method of claim 1 further comprising:

presetting an anti-ingress DOOR LOCK device which serves to inhibit manual operability of at least the rear door latch mechanism's said exterior release device and thereby usually restricting entry into the vehicle; and, unsetting the DOOR LOCK device in response to the sensing of the collision thereby enabling manual operability at least the rear door latch mechanism's said exterior release device and thereby enable vehicle access subsequent to the collision.

8. The method of claim 7 including a preventing of a false release of the DOOR LOCK and unauthorized access into the motor vehicle, therefor further comprising the steps of:

locking operation of the motor vehicle through an ignition switch having at least an OFF state and an ON state; and, inhibiting the release of the DOOR LOCK device in said response to the sensing of the collision when the ignition switch is concurrently in the OFF state.

9. A collision responsive releasing method for automatically disengaging an anti-egress child-lock safety mechanism included in a rear door latch mechanism of a motor vehicle to enable an entrapped occupant to manually unlatch and usually open the motor vehicle's rear door as a potential post-collision exit route, comprising:

presetting the anti-egress child-lock safety mechanism to a SET or blocked state and thereby inhibiting pre-collision manual operability of the interior unlatching device for the rear door latch mechanism by the occupant, operating the motor vehicle with the anti-egress child-lock mechanism preset in the blocked state;

encountering a collision usually between the motor vehicle and another object;

sensing an impact level of the collision exceeding a predetermined impact threshold level; and, releasing the anti-egress child-lock mechanism to an UNSET or unblocked state in automatic response to the sensed impact level and thereby enable a post-collision said manual operability of the interior unlatching device for the rear door latch mechanism by the occupant.

10. The collision responsive releasing method of claim 9 further comprising:

said sensing of the impact level produces an electrical crash signal; and, unsetting the preset said anti-egress child-lock device in response to the electrical crash signal.

11. The collision responsive releasing method of claim 10 further comprising:

locking operation of the motor vehicle through an ignition switch including a first electrical contact set portion having at least an OFF state and an ON state;

circuitously coupling the electrical crash signal with at least the first contact set portion of the ignition switch and an electric child-lock releaser device;

opening the first contact set when the ignition switch is in the OFF state thereby denying coupling of the produced electrical crash signal and the electric child-lock releaser device;

closing the first contact set when the ignition switch is in at least the ON state thereby usually enabling coupling of the produced electrical crash signal and the electric child-lock releaser device; and, powering the electric child-lock releaser device by the produced electrical crash signal to release the anti-egress child-lock mechanism to an UNSET state.

12. The collision responsive releasing method of claim 10 further comprising:

locking operation of the motor vehicle through an ignition switch including a first electrical contact set having at least an OFF state and an ON state;

circuitously coupling the first electrical contact set, a source of electric power and an electric child-lock SET device;

opening the first contact set when the ignition switch is in the OFF state thereby denying coupling of the source of electric power with the electric child-lock SET device;

closing the first contact set when the ignition switch is in the ON state thereby enabling a coupling of the source of electric power with the electric child-lock SET device, thereby setting the anti-egress child-lock mechanism to a locked state; and, interrupting the circuitous coupling of the source of electric power and the electric child-lock SET device in response to the electrical crash signal, thereby said unsetting the anti-egress child-lock mechanism.

13. The collision responsive releasing method of claim 9 comprising:

an inertial shifting of a mass relative with a sacrificial member in response to the sensed said impact level;

shearing the sacrificial member in response to the inertial shifting of the mass;

expressing an automatic extension of an actuator member in response to the shearing of the sacrificial member; and, actuating the anti-egress child-lock mechanism to the UNSET state in automatic response to the expressed said extension of the actuator member.

14. The collision responsive releasing method of claim 9 further comprising:

fitting at least one passenger door of the motor vehicle with a DOOR LOCK mechanism;

presetting at least one said DOOR LOCK mechanism to a locked state thereby inhibiting operability of a corresponding exterior door unlatching device; and, releasing the preset said DOOR LOCK mechanism to an unlocked state in response to the sensed impact level thereby enabling operability of the corresponding exterior door unlatching device.

15. A collision responsive child-lock control apparatus producing an automatic release of an anti-egress child-lock means for a motor vehicle passenger door, comprising:

a passenger door latch means including an anti-egress child-lock means which may be enabled by an operator engaged preset means to inhibit interior operability of the door latch means by an occupant of the motor vehicle;

a collision sensing means responsive to an impact level in excess of a predetermined threshold;

a release means coupled with the collision sensing means and the anti-egress child-lock means to produce automatic disengagement of the anti-egress child-lock device upon responsive sensing of a collision and thereby reinstate interior operability of the door latch means by the occupant of the motor vehicle.

16. Collision responsive child-lock control apparatus of claim 15 comprising:

said release means including an electromotive actuator means circuitously coupled with the collision sensing means and a source of electric power to automatically disengage and thereby UNSET the child-lock device in an emergency.

17. Collision responsive child-lock control apparatus of claim 15 comprising:

a source of electric power;

said collision sensing means including an impact responsive electrical switching means normally maintained in a first conductive state which changes to a second state of conductance upon sensing of a collision;

seriate circuit means including the source of electric power, the impact responsive electrical switching means, and an electromotive actuator means coupled with the release means; whereby, the anti-egress child-lock is released or UNSET by the electromotive actuator means upon occurrence of a second state of conductance through the impact responsive electrical switching means.

18. Collision responsive child-lock control apparatus of claim 15 comprising:

a source of electric power;

child-lock mode control switch means;

said collision sensing means including an impact responsive electrical switching means normally maintained in a conductive state which changes to an impeded state of conductance upon sensing of a collision;

a mode control switch means including an engaged or PRESET mode and a disengaged or UNSET mode;

a seriate circuit means including the source of electric power, the mode control switch means, the impact responsive electrical switching means, and an electromotive actuator means coupled with at least the preset means; whereby, the mode control switch is set to the PRESET mode enabling substantial conductance therethrough;

the anti-egress child-lock is enabled or PRESET by the electromotive actuator means upon a state of conductance through the seriate circuit; and, the anti-egress child-lock is disengaged or UNSET by the electromotive actuator means upon occurrence of an interruption of a state of conductance through the seriate circuit.

19. Collision responsive child-lock control apparatus of claim 15 comprising:

said collision sensing means including an inertia responsive mass means coupled with a force responsive member;

said release means coupled with the force responsive member portion of the collision sensing means; and whereby, the anti-egress child-lock means is ordinarily disengaged or UNSET when at least a threshold level of collision induced force acts upon the inertia responsive mass means as determined by the force responsive member.

20. Collision responsive child-lock control apparatus of claim 15 comprising:

a DOOR LOCK electric release device coupled with a door lock portion of the motor vehicle; and, a central unlocking means coupled with the DOOR LOCK electric release device and the collision sensing means to produce a local unlocking of the DOOR LOCK portion of the motor vehicle and enabling operability of exterior door unlatching devices and access into the motor vehicle by a person outside of the motor vehicle.

* * * * *